United States Patent [19]

Rainone

[11] 4,257,764
[45] Mar. 24, 1981

[54] FLASH LAMP ARRAY WITH IMPROVED SWITCH MOUNTING

[75] Inventor: Nicholas J. Rainone, Clifton, N.J.

[73] Assignee: Westinghouse Electric Corp., Pittsburgh, Pa.

[21] Appl. No.: 907,217

[22] Filed: May 18, 1978

[51] Int. Cl.³ .............................................. F21K 5/00
[52] U.S. Cl. .................................... 431/359; 362/15; 362/6
[58] Field of Search ................. 431/359; 362/4, 6, 11, 362/13-15

[56] References Cited

U.S. PATENT DOCUMENTS

| | | | |
|---|---|---|---|
| 3,951,582 | 4/1976 | Holub et al. | 431/359 |
| 3,969,065 | 7/1976 | Smialek | 431/359 |
| 3,988,647 | 10/1976 | Bolon et al. | 431/359 |
| 3,990,832 | 11/1976 | Smialek et al. | 431/359 |
| 3,994,664 | 11/1976 | Cusano | 431/359 |
| 4,080,155 | 3/1978 | Sterling | 431/359 |

Primary Examiner—Carroll B. Dority, Jr.
Attorney, Agent, or Firm—R. S. Lombard

[57] ABSTRACT

A flash lamp array is disclosed having a plurality of flash lamps connected to sequencing circuitry on a circuit board. A plurality of solid-state thermally activated switches, having predetermined composition and physical characteristics and predetermined dimensions, are located externally of the lamps and affixed directly to one side of the circuit board. The sequencing circuitry includes printed circuit branches having a plurality of spaced-arm sections two of which overlay each of the switches and terminate proximate each of the switches. The exposed surface portion of the switches upon being irradiated by a flashed lamp converts to an electrically conductive state to insure a closed electrical circuit between the overlaying spaced-arm sections of the printed circuit.

5 Claims, 3 Drawing Figures

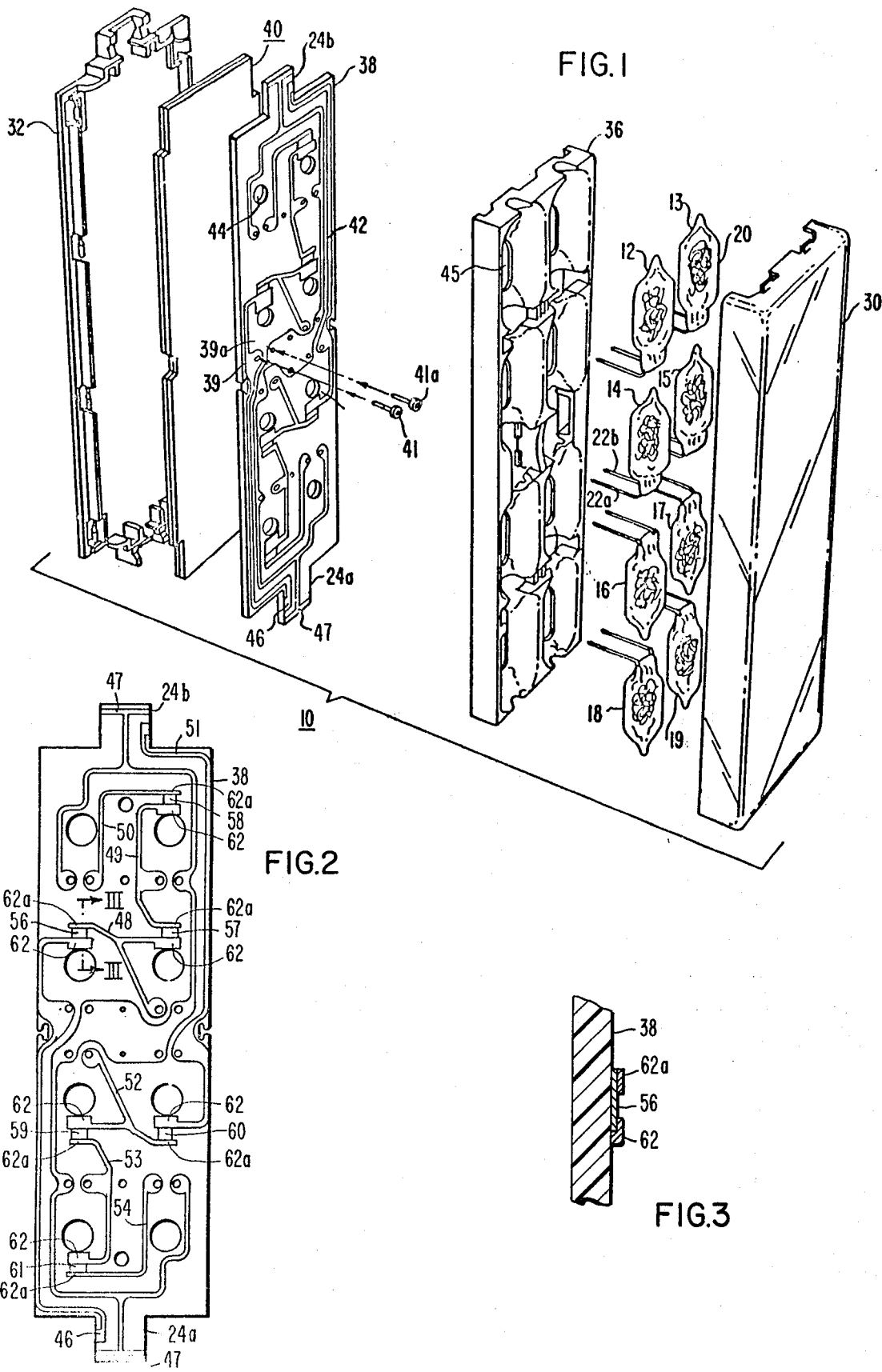

FLASH LAMP ARRAY WITH IMPROVED SWITCH MOUNTING

CROSS-REFERENCE TO RELATED APPLICATION

In copending application Ser. No. 912,777, filed by H. R. Heytmeijer and owned by the same assignee, is described a flash lamp array including a plurality of flash lamps and a two-sided circuit board having sequencing circuitry affixed to one side thereof and having the lamps connected thereto to fire individually and in sequence. The array includes solid-state thermally activated switches comprising a uniform mixture of predetermined proportions of finely divided silver carbonate, finely divided silver oxide and finely divided hydrophobic silica. The mixture is adhered to the circuit board as a unitary mass of predetermined dimensions by means of an organic polymer binder.

BACKGROUND OF THE INVENTION

This invention relates to flash lamp arrays and, more particularly, to a flash lamp array having solid-state thermally activated switches. Many flash lamp arrays utilizing thermally activated switches for sequentially firing flash lamps have been disclosed in recent years. One such array is disclosed in U.S. Pat. No. 3,990,833, dated Nov. 9, 1976, and issued to Holub et al. The Holub patent discloses a flash lamp array that utilizes solid-state radiant energy switching devices as part of the electrical circuit for sequentially firing the flash lamps. Each device is located adjacent one of the lamps to receive radiant energy emitted by the lamp, the device being a mass of the composition preferably comprising silver oxide, a carbon containing silver salt and humidity resistant organic polymer binder. The switch device initially has a relatively high resistance and, after undergoing thermochemical change upon the flashing of the lamp, has a relatively low electrical resistance. The switching devices as disclosed in the Holub patent each bridge a switch terminal pair which is part of the conductor runs of the printed circuit. The switching devices as shown in the drawing in the Holub patent overlay the switch terminal pairs. Although this design normally works well, problems may be encountered because of non-uniform switch pad thickness; cracking in the switch pad upon drying due to the unevenness of the substrate; and, non-conversion to the low resistance state due to the heat sink created effect by the switch terminal pairs.

SUMMARY OF THE INVENTION

The present improvement is provided in combination with a flash lamp array including a plurality of flash lamps each having a vitreous envelope hermetically sealed to a pair of lead-in wires. The array further includes a two-sided circuit board having sequencing circuitry including electrically conducting printed circuit branches affixed to one side thereof. The lamps are connected to the sequencing circuitry and are positioned proximate the one side of the circuit board so as to fire individually and in sequence.

The improvement comprises a plurality of solid-state thermally activated switches of predetermined composition and physical characteristics and predetermined dimensions. The switches are located externally of the lamps and are fixed directly to the one side of the circuit board. Each of the switches are located in close proximity to a predetermined one of the flash lamps to receive radiant thermal energy emitted by the proximate flash lamp upon its being flashed and as a result thereof to change its chemical composition from an electrically non-conductive state to an electrically conductive state.

The switches together with the electrically conducting printed circuit branches form the sequencing circuitry. The printed circuit branches have a plurality of spaced-arm sections two of which overlay each of the switches and terminate proximate each of the switches to form spaced electrically conducting arm sections separated by a portion of the switches, and upon being irradiated the exposed surface portion of the switches convert to an electrically conductive state to insure a closed electrical circuit between the overlaying spaced arm sections of the printed circuit.

BRIEF DESCRIPTION OF THE DRAWINGS

For a better understanding of the invention, reference may be had to the exemplary embodiment shown in the accompanying drawings in which:

FIG. 1 is an exploded isometric view of a typical flash lamp array showing the internal parts;

FIG. 2 is a plan view of a circuit board showing the electrical circuitry, including the positioning of the spaced-arm sections relative to the switches; and FIG. 3 is a cross-sectional view taken on the line III—III of FIG. 2.

DESCRIPTION OF THE PREFERRED EMBODIMENT

FIG. 1 shows a typical flash lamp array 10 including a plurality of electrically fired flash lamps 12–19 each having a tubular-shaped vitreous envelope 20 hermetically sealed to a pair of lead-in wires 22a, 22b. The lamp array 10 is provided with a plug-in connector tab 24a at the lower side or end thereof, adapted to be mountable in a socket of a camera or flash adaptor. The lamp array 10 is also provided with a second plug-in connector tab 24b at the upper side or end thereof, whereby the array 10 can be mounted in a camera socket or a flash adaptor by either tab 24a or 24b to fire all of the lamps, as is conventional in such a design. The array 10 comprises an upper group of flash lamps 12, 13, 14, 15 and a lower group of flash lamps 16, 17, 18, 19, the lamps being arranged in a planar configuration. When the array 10 is mounted in the camera socket by the tab 24a, only the upper group of the lamps will be flashed; likewise, when the array is mounted in the camera socket by tab 24b, only the other group (now in the uppermost position) will be flashed. With this arrangement having only the lamps relatively far from the lamp's axis being flashable, the undesirable "red eye" effect will be reduced, as is well known in the art. The array also includes a front cover 30 for covering the flash lamps which is normally made of a light transmitting, impact resistant, color corrected plastic such as butadiene styrene and a rear cover member 32 which is normally made of a clear plastic such as polystyrene. The front cover member 30 and the rear cover member 32 are affixed to one another by any suitable means such as, with adhesive. Between the front cover member 30 and the rear cover member 32, in the following order, are the flash lamps 12–19, reflector member 36 for reflecting light from the flash lamps toward the front cover member 30, a two-sided circuit board 38 provided with the integral connecting tabs 24a, 24b, and a flash sensing indicator means 40.

The two-sided circuit board 38 has affixed to one side thereof nearest the reflector member 36 sequencing circuitry 42 having lead-in wires 22a, 22b connected in circuit therewith for automatically flashing the lamps in each group in a predetermined sequence. The lamps 12-19 are positioned in close proximity to the one side of the circuit board 38. The circuit board 38 is provided with windows 44 therethrough, each in alignment with one of the lamps 12-19 to permit the passage of radiant energy upon the flashing of each of the aligned lamps. The lead-in wires 22a, 22b may be electrically connected to the sequencing circuitry 42 by any suitable means such as, providing the circuit board 38 with holes 39, 39a into which metallic eyelets 41, 41a are inserted. The lead-in wire 22a, 22b are of sufficient length to extend through the eyelets 41, 41a. The eyelets are then crimped thereby electrically connecting the lead-in wires 22a, 22b to the sequencing circuitry 42. The reflector 36 also has openings 46 provided therein in alignment with the windows 44 and the lamps 12-19. Preferably the flash sensing indicator 40 is in close proximity to the other side of the circuit board 38 and is readily observable by an operator of the flash lamp array 10 through the clear transparent plastic rear cover member 32. The flash sensing indicator 40 indicates to the operator which lamps have been flashed.

In FIG. 2 is shown the two-sided circuit board 38 including electrically conducting printed circuit branches 47-54 affixed to one side of the circuit board 38. The lamps 12-19 are connected to the circuit branches 47-54 and positioned proximate to one side of the circuit board 38 to fire individually and in sequence. There is provided a plurality of solid-state thermally activated switches 56-61 of predetermined composition and physical characteristics and predetermined dimensions located externally of the lamps 12-19 and affixed directly to the one side of the circuit board 38. As stated in the cross-referenced application, the switches preferably comprise a uniform mixture of predetermined proportions of finely divided silver carbonate with an average particle size of about 1.0 to 2.5 microns, finely divided silver oxide with an average particle size of about 1.0 to 3.0 microns and finely divided hydrophobic silica having a nominal particle size on the order of 0.007 micron. The mixture is adhered as a unitary mass of predetermined dimensions, for example, ⅛ in. × ⅛ in. (3.2 mm × 3.2 mm), to the circuit board 38 by means of an organic polymer binder. An organic polymer binder such as polystyrene works well having no tendency to react with silver oxide. Preferably the organic polymer binder comprises polystyrene in a readily vaporizable ester such as ethylene glycol monoethyl ether acetate vehicle for purposes of application. The ratio by weight of the binder to the mixture should be from about 1:40 to 1:3. When polystyrene is used as the binder, the preferred ratio by weight of polystyrene to the mixture in the switches is about 1:10. Switches composed of finely divided silver carbonate as 79.25 weight percent of the mixture, finely divided silver oxide as 20 weight percent of the mixture and finely divided hydrophobic silica as 0.75 weight percent of the mixture perform well.

Each of the switches 56-61 is located in close proximity to a predetermined one of the flash lamps 12-19 to receive radiant thermal energy emitted by the proximate flash lamp upon its being flashed and as a result thereof to change its chemical composition from an electrically non-conductive state to an electrically conductive state, in this instance to metallic silver. The switches 56-61 together with the electrically conducting printed circuit branches 47-54 form the sequencing circuitry 42.

The printed circuit branches 47-54 have a plurality of arm sections pairs 62, 62a which as shown in FIG. 3 are spaced and overlay each of the switches and terminate proximate each of the switches. Each of the spaced-arm section pairs 62, 62a are separated by a portion of the switches, and upon being irradiated, at least the exposed surface portion of the switches converts to an electrically conductive state to insure a closed electrical circuit between the overlaying spaced-arm section pairs 62, 62a of the sequencing circuitry 42. This configuration results in the following improvements over the prior art: a controlled switched thickness; conversion of the top layer of a switch being all that is necessary to insure a closed electrical circuit between the spaced-arm section pairs; the heat sink characteristic of the circuit branches is removed as a significant factor; and conversion efficiency is improved.

Switches can be made as described in the cross-referenced application. Before the printed circuit branches are applied to the circuit board 38, the switch ink is applied to the one side of the circuit board by silk screening and is dried in a circulating air drier at 70° C. for about 10 minutes to form the switches 56-61. The circuit branches 47-54 are then applied to the circuit board 38.

With the array 10 mounted in a camera socket using tab 24a, the array functions as follows: when the operator of a camera actuates the shutter, a piezoelectric voltage is applied across circuit branches 46, 47, the voltage because of the design of the circuitry 42 is first applied to flash lamp 14 through lead-in conductors 22a, 22b. Immediately before the activation of the shutter, the switches 56-61 are all in the non-conductive or high resistant state. Upon the flashing of lamp 14, switch 56 will receive radiation from the proximate lamp thereby changing from a non-conductive to a conductive state causing a closed electrical circuit to exist between the overlaying spaced-arm section pairs 62, 62a. As switch 45 becomes conductive, a flash indicator 40 will indicate to the operator that a lamp has been flashed. Upon the next actuation of the shutter by the operator, lamp 15 is caused to fire because of switch 57 becoming conductive and the process is repeated as hereinbefore explained until lamp 12 is fired at which time the array should be turned end over end with tab 24b being mounted in the camera socket and the lamps 16-19 are ready to be flashed in the same sequential manner.

What we claim is:

1. In combination with a flash lamp array including a plurality of flash lamps each having a vitreous envelope hermetically sealed to a pair of lead-in wires, a two-sided circuit board having sequencing circuitry including electrically conducting printed circuit branches affixed to one side thereof and having said lamps connected thereto and positioned proximate said one side of said circuit board to fire individually and in sequence, the improvement which comprises:

a plurality of solid-state thermally activated switches of predetermined composition and physical characteristics and predetermined dimensions located externally of said lamps and affixed directly to said one side of said circuit board, said composition comprising a mixture of finely divided silver carbonate, finely divided silver oxide and finely divided hydrophobic silica dispersed in an organic polymer binder, each of said switches located in close proximity to a predetermined one of said flash lamps to receive radiant thermal energy emitted by said proximate flash lamp upon its being flashed and as a result thereof to change its chemical composition from an electrically non-conductive state to an electrically conductive state, and said switches together with said electrically conducting printed circuit branches forming said sequencing circuitry, said printed circuit branches having a plurality of arm sections a pair of which are spaced and overlay each of said switches and terminate proximate each of said switches, said spaced-arm section pairs are separated by a portion of said switches, and upon being irradiated at least the exposed surface portion of said switches converts to an electrically conductive state to insure a closed electrical circuit between the overlaying spaced-arm section pairs of said sequencing circuitry.

2. The array of claim 1, wherein said mixture of finely divided material comprises 79.25 wt. percent of silver oxide, 20 wt. percent of silver carbonate, and 0.75 wt. percent of hydrophobic silica.

3. The array of claim 2, wherein said organic polymer binder comprises polystyrene.

4. The array of claim 3, wherein the ratio by weight of said binder to said mixture in said switches is from about 1:40 to 1:3.

5. The array of claim 4, wherein the ratio by weight of said polystyrene to said mixture in said switches is about 1:10.

* * * * *